(12) United States Patent
Iwasaki et al.

(10) Patent No.: US 7,781,507 B2
(45) Date of Patent: Aug. 24, 2010

(54) ROOM TEMPERATURE-CURABLE ORGANOPOLYSILOXANE COMPOSITION

(75) Inventors: Isao Iwasaki, Annaka (JP); Tsuneo Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 48 days.

(21) Appl. No.: 11/802,376

(22) Filed: May 22, 2007

(65) Prior Publication Data
US 2007/0276085 A1    Nov. 29, 2007

(30) Foreign Application Priority Data
May 24, 2006  (JP) .............. 2006-143903

(51) Int. Cl.
*C08K 5/00* (2006.01)
*B32B 27/28* (2006.01)
*C04B 35/634* (2006.01)
*C08F 283/12* (2006.01)

(52) U.S. Cl. ............... 524/322; 524/284; 524/300; 525/477

(58) Field of Classification Search ........... 524/322, 524/284, 300; 525/477
See application file for complete search history.

(56) References Cited

U.S. PATENT DOCUMENTS 5,665,805 A * 9/1997 Hatanaka et al. ........... 524/322
5,705,587 A * 1/1998 Hatanaka et al. ........... 528/17

FOREIGN PATENT DOCUMENTS

JP      63-83167 A       4/1988
JP      9-151326 A       6/1997
JP      2004-182942 A    7/2004

* cited by examiner

Primary Examiner—William K Cheung
(74) Attorney, Agent, or Firm—Birch, Stewart, Kolasch & Birch, LLP

(57) ABSTRACT

A room temperature-curable polyorganosiloxane composition is provided. This composition contains
(a) a polydiorganosiloxane represented by the following general formula (1) or (2):

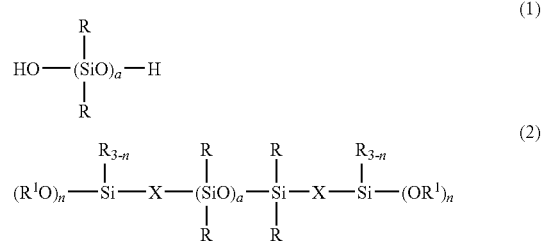

wherein R is a monovalent hydrocarbon group, a is an integer of at least 10, $R^1$ is a monovalent hydrocarbon group, X is oxygen atom or a divalent hydrocarbon group, and n is an integer of 1 to 3;

(b) a triorganosilanol represented by general formula (3):

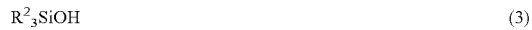

wherein $R^2$ is a monovalent hydrocarbon group;

(c) an organosilane containing at least 3 hydrolyzable groups in one molecule and/or its partial hydrolysate; and (d) a calcium carbonate.

10 Claims, No Drawings

ROOM TEMPERATURE-CURABLE ORGANOPOLYSILOXANE COMPOSITION

CROSS-REFERENCE TO RELATED APPLICATION

This non-provisional application claims priority under 35 U.S.C. §119(a) on Patent Application No. 2006-143903 filed in Japan on May 24, 2006, the entire contents of which are hereby incorporated by reference.

TECHNICAL FIELD

This invention relates to a polyorganosiloxane composition which cures at room temperature to form a rubber elastomer, and more specifically, this invention relates to a room temperature-curable polyorganosiloxane composition which generates reduced contamination when used for a joint between rocks or the like, and which forms a cured product having an improved adhesion to various substrates, and in particular, to a coated aluminum substrate.

BACKGROUND ART

Compositions which cure at room temperature to form a silicone elastomer have been known in the art, and such compositions have been widely used in the industry. The mechanisms of the room temperature curing include the one in which the curing is realized by hydrosilylation, the one realized by UV irradiation, the one realized by condensation between hydroxy group and a hydrolyzable group bonded to silicon atom, and the like. Among these, the polyorganosiloxane composition which cures by condensation is well adapted for applications such as building sealant since it is capable of curing and accomplishing the adhesion at room temperature, and it is less likely to experience curing inhibition by the impurities as often encountered in the case of the curing by hydrosilylation.

In the case of building sealants, the cured rubber is often required to exhibit low elasticity corresponding to the category of low to medium modulus in modulus at 50% elongation (M50) defined by Japan Sealant Industry Association. In order to meet such requirements, various techniques have been proposed, and exemplary such techniques include dilution with a silicone oil having no reactive group and addition of various plasticizers. While these techniques showed some effects in realizing the low modulus, prolonged use of such sealants often caused staining of the joint surface and the staining of porous materials such as natural rocks due to the bleeding, and improvement of such drawbacks has been awaited.

Prevention of the staining can be realized by using a non-reactive silicone oil or by using a composition which does not include the silicone oil or the plasticizer. Such composition, however, is associated with the problem of high modulus after the curing and insufficient adhesion to metals and various coatings. In order to produce a soft rubber which does not contain a plasticizer, attempts have been made to reduce crosslink density after the curing by using a combination of a difunctional crosslinking agent having chain extending ability with a polyfunctional crosslinking agent to thereby extend the polydiorganosiloxane chain during the curing simultaneously with the crosslinking. Typical such commercially available compositions include those called aminoxy type using a siloxane having a N,N-dialkylaminoxy group for the crosslinking agent, and those called amide type using a siloxane having N-alkyl acetamide group for the crosslinking agent. These compositions, however, have been associated with the problems of insufficient storage stability of the composition and curing inhibition caused by the presence of a compound having active hydrogen such as an alcohol.

Production of a rubber having a low crosslink density and good storage stability which does not experience curing inhibition is proposed in Patent Document 1 (JP-A 63-83167) which involves use of a functional group which has been widely used in the art. While this method uses RNHCH$_2$MeSi(OMe)$_2$ having chain extending ability, economical production of this compound has been extremely difficult, and stable use of such compound in good balance with other crosslinking agent has also been difficult. Also proposed are methods using a polydiorganosiloxane having hydroxy group at one end and a trialkylsiloxy group on the other end (Patent Documents 2 and 3: JP-A 9-151326 and JP-A 2004-182942). When the polydiorganosiloxane having hydroxy group at one end is produced by equilibrated polymerization of an organocyclopolysiloxane using an alkali or acid catalyst, namely, by a method commonly used in the art, non-reactive polydiorganosiloxane is produced as a by-product. Since removal of this non-reactive by-product polydiorganosiloxane has been impossible, use of this composition has been associated with the problem of staining, for example, staining of the joints of the natural rocks by bleeding. Production of such non-reactive polydiorganosiloxane can be reduced by using a method in which ring-opening polymerization of cyclic siloxane trimer is conducted by using trimethylsiloxy lithium for the initiator; or by using a method in which the polymerization is conducted in the presence of a pentacoordinated silicon compound using trimethyl hydroxy silane for the initiator. These methods, however, are economically disadvantageous since both the monomer and the catalyst are expensive.

As described above, there has so far been no sealant which is less likely to stain the surface such as the surface of a natural rock by bleeding, and which cures into a soft rubber having a low to medium modulus favorable for a sealant as well as excellent adhesion and improved storage stability.

DISCLOSURE OF THE INVENTION

An object of the present invention is to solve the drawbacks of the prior art as described above, and provide a room temperature-curable polyorganosiloxane composition which has excellent storage stability before the curing, but once cured, exhibits excellent adhesion to various metals and coatings as well as low rubber elasticity with medium to low modulus and which gives a cured article exhibiting reduced staining by bleeding of the porous materials such as natural rocks with which the article is used.

In order to achieve such object, the inventors of the present invention made an intensive study and found that, when a polydiorganosiloxane represented by the following general formula (1) or (2); a triorganosilanol represented by the general formula (3); and an organosilane having at least 3 hydrolyzable groups in one molecule and/or its partial hydrolysate; and calcium carbonate are blended, the resulting composition exhibits excellent adhesion to the material to be adhered, in particular, to an aluminum member which has been surface treated with a fluororesin, acrylic resin, or the like; low elasticity; less likeliness of staining a porous material such as natural rock after curing; and an improved storage stability during the storage of the composition, and the problems as described above can be solved. The present invention has been completed on the bases of such finding.

Accordingly, the present invention provides a composition comprising (a) 100 parts by weight of a polydiorganosiloxane represented by the following general formula (1) or (2):

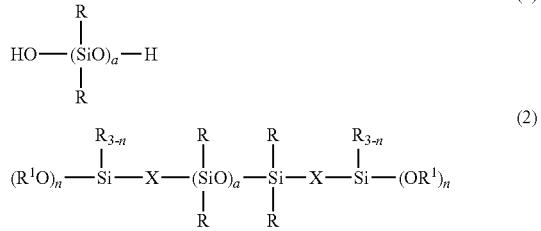

wherein R is independently an unsubstituted or substituted monovalent hydrocarbon group, a is an integer of at least 10, $R^1$ is independently an unsubstituted or substituted monovalent hydrocarbon group containing 1 to 6 carbon atoms, X is oxygen atom or an unsubstituted or substituted divalent hydrocarbon group containing 2 to 6 carbon atoms, and n is an integer of 1 to 3;

(b) 0.1 to 10 parts by weight of a triorganosilanol represented by general formula (3):

wherein $R^2$ is independently an unsubstituted or substituted monovalent hydrocarbon group containing 1 to 20 carbon atoms;

(c) 1 to 20 parts by weight of an organosilane containing at least 3 hydrolyzable groups in one molecule and/or its partial hydrolysate; and (d) 10 to 300 parts by weight of calcium carbonate. In this case, content of a straight chain and/or a branched polydiorganosiloxane containing at least 2 triorganosiloxy groups in one molecule is preferably less than 10 parts by weight to 0 parts by weight in relation to 100 parts by weight of component (a). The polyorganosiloxane composition may further contain (e) a silane coupling agent and/or (f) a curing catalyst. Components (b) and (c) may be preliminarily mixed before mixing with other components. The polyorganosiloxane composition of the present invention is well adapted for use in building sealant.

EFFECTS OF THE INVENTION

The room temperature-curable polyorganosiloxane composition of the present invention exhibits excellent adhesion to the material to be adhered by the composition, in particular, to a surface treated aluminum member as well as reduced staining of porous rock materials such as granite by bleeding, and the composition cures into a low modulus article. Accordingly, the composition of the present invention is highly adapted for use as an adhesive, a coating agent, an electric sealant, a building sealant, and the like.

DESCRIPTION OF THE PREFERRED EMBODIMENTS

The component (a) of the room temperature-curable polyorganosiloxane composition of the present invention is the polydiorganosiloxane represented by the following general formula (1) or (2):

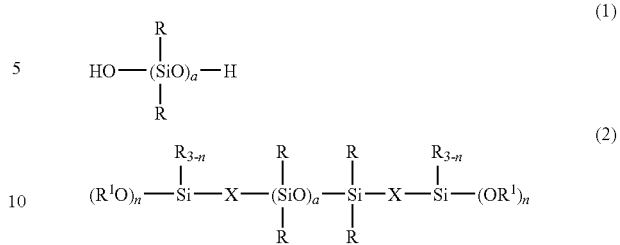

This component (a) is the main component in the composition of the present invention. In the formulae, R is independently an unsubstituted or substituted monovalent hydrocarbon group, a is an integer of at least 10, $R^1$ is independently an unsubstituted or substituted monovalent hydrocarbon group containing 1 to 6 carbon atoms, X is oxygen atom or an unsubstituted or substituted divalent hydrocarbon group containing 2 to 6 carbon atoms, and n is an integer of 1 to 3.

In the general formulae (1) and (2), R may be independently a monovalent hydrocarbon group containing 1 to 6 carbon atoms, for example, an alkyl group such as methyl group, ethyl group, propyl group, isopropyl group, or hexyl group; a cycloalkyl group such as cyclohexyl group; an alkenyl group such as vinyl group, allyl group, or propenyl group; or an aryl group such as phenyl group; or a monovalent substituted hydrocarbon group wherein some or all of the hydrogen atoms in such group have been substituted with a halogen atom or the like, for example, chloromethyl group and 3,3,3-trifluoropropyl group. "a" is an integer of at least 10 as described above. However, "a" is more preferably a number such that the polydiorganosiloxane has a viscosity at 23° C. of 100 to 1,000,000 mPa·s, and more preferably 500 to 200,000 mPa·s. The viscosity is the value measured with a rotational viscometer. $R^1$ is independently an alkyl group such as ethyl group, ethyl group, propyl group, or isopropyl group; an alkenyl group such as isopropenyl group; or a monovalent substituted hydrocarbon group wherein some or all of the hydrogen atoms in such group have been substituted with a halogen atom or the like, for example, chloromethyl group and 3,3,3-trifluoropropyl group; among which methyl group and ethyl group being preferable in view of the reactivity. X may be oxygen atom, ethylene group, propylene group, butylenes group, and/or 2-methyl propylene group. "n" is an integer of 1 to 3, and more preferably, an integer of 2 or 3.

The triorganosilanol which is the component (b) of the present invention is a component which is basic in the present invention, and acts as a component which reduces the modulus and improves the adhesion. The component (b) is represented by the following general formula (3):

wherein $R^2$ is independently an unsubstituted or substituted monovalent hydrocarbon group containing 1 to 20 carbon atoms.

In the general formula (3), $R^2$ is an unsubstituted or substituted monovalent hydrocarbon group containing 1 to 20 carbon atoms, and in particular, the one containing 1 to 10 carbon atoms. Exemplary such groups include alkyl groups such as methyl group, ethyl group, propyl group, butyl group, and hexyl group; aryl groups such as phenyl group and tollyl group; aralkyl groups such as vinyl group, allyl group, butenyl group, benzyl group, and 2-phenylethyl group; groups wherein some or all of the hydrogen atoms bonded to the carbon atoms in such group have been substituted with a halogen atom, cyano group, or the like, such as chloromethyl group, trifluoropropyl group, and cyanoethyl group. The preferred are methyl group, ethyl group, phenyl group, vinyl group, and trifluoropropyl group, and in particular, methyl group and phenyl group in view of the ease of production.

The component (b) is used at 0.1 to 10 parts by weight, and preferably at 0.5 to 5 parts by weight in relation to 100 parts by weight of the component (a). When the content in relation to the component (a) is less than 0.1 parts by weight, intended benefits are not sufficiently realized, and the resulting composition will not be able to realize the intended rubber elasticity. At a content in excess of 10 parts by weight, the resulting composition may suffer from inferior curability and adhesion.

The component (c) of the present invention is an organosilane containing at least 3 hydrolyzable groups in one molecule and/or its partial hydrolysate. This component acts as a storage stabilizer and a crosslinking agent in the room temperature-curable polyorganosiloxane composition of the present invention. Exemplary hydrolyzable groups in such organosilanes or its partial hydrolysate include a ketoxime group, an alkoxy group, an acetoxy group, and an isopropenoxy group. Examples of the organosilane include ketoxime silanes such as tetrakis(methylethylketoxime)silane, methyltris(dimethylketoxime)silane, methyltris(methylethylketoxime)silane, ethyltris(methylethylketoxime)silane, methyltris (methyl isobutyl ketoxime)silane, and vinyl tris (methylethylketoxime)silane; alkoxysilanes such as methyltrimethoxysilane, vinyltrimethoxysilane, phenyltrimethoxysilane, and vinyltriethoxy silane; acetoxysilanes such as methyltriacetoxysilane and vinyltriacetoxysilane; isopropenoxy silanes such as methyltriisopropenoxysilane, vinyltriisopropenoxysilane, and phenyltriisopropenoxysilane; and a partial hydrolysate/condensate of such silahes, which may be used alone or in combination of two or more.

The component (c) is used at 1 to 20 parts by weight, and preferably at 5 to 15 parts by weight in relation to 100 parts by weight of the component (a). When the content in relation to the component (a) is less than 1 parts by weight, sufficient crosslinking is not realized, and production of the composition having the intended rubber elasticity is difficult. At the content in excess of 20 parts by weight, the resulting article after curing will suffer from insufficient rubber elasticity and economic disadvantage.

The calcium carbonate of component (d) may be either the calcium carbonate which has been treated with a fatty acid, a resin acid, a rosin acid, and/or an alkali metal salt, an alkaline earth metal salt, a fatty acid ester, or a quaternary ammonium salt thereof or non-treated calcium carbonate. Exemplary resin acids which may be used include abietic acid, dehydroabietic acid, dextropimaric acid, levopimaric acid, palustrin acid, and sandaracopimaric acid. The carboxylic acid is not limited to such acids, and exemplary other acids include those containing at least 12 carbon atoms such as stearic acid, oleic acid, palmitic acid, and lauric acid. The treated calcium carbonate may be colloidal calcium carbonate having an average primary particle size of up to 0.1 µm, and in particular, up to 0.03 to 0.1 µm, and/or heavy calcium carbonate having an average primary particle size of at least 0.1 µm, which may be used alone or in combination. The amount of the calcium carbonate treated by such treatment agent may be up to 3.0% by weight, and in particular, 0.5 to 2.5% by weight in relation to the amount of the calcium carbonate. Inclusion of such treated calcium carbonate in excess of 3.0% by weight results in the loss of adhesion property of the composition.

The particle size of the colloidal calcium carbonate is the value measured by using an electron microscope, and the particle size of the heavy calcium carbonate is the value evaluated by-measuring specific surface area by an air permeability apparatus, and calculating the particle size from the specific surface area.

The calcium carbonate of component (d) is preferably used at 10 to 300 parts by weight, and in particular, at 30 to 200 parts by weight in relation to 100 parts by weight of component (a). When used at less than 10 parts by weight, intended reinforcing action will not be realized. At a content in excess of 300 parts by weight, kneading in the production of the composition will be difficult, and the cured article will have insufficient rubber elasticity, namely, the resulting composition will not be able to realize the intended rubber elasticity.

The composition of the present invention may optionally have other fillers incorporated, and exemplary such fillers include crystalline silica fine powder, amorphous silica fine powder, silicone rubber powder, silica hydrogen, silica aero gel, diatomaceous earth, calcium silicate, aluminum silicate, titanium oxide, aluminum oxide, zinc oxide, ferrite, iron oxide, carbon black, graphite, mica, clay, and bentonite. These fillers may be added at a content commonly used in the art and which does not adversely affect the advantages of the present invention.

The composition of the present invention may further contain a silane coupling agent as the component (e) in order to improve adhesion property of the composition. Preferable silane coupling agent used is the one known in the art. Particularly preferred are those having an alkoxysilyl, a ketoximesilyl, or an alkenoxysilyl group as the hydrolyzable group, and exemplary such compositions include vinyltris(2-methoxyethoxy)silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl)3-aminopropyltrimethoxysilane, 3-aminopropyltriethoxysilane, 3-(N-aminomethylbenzylamino)propyltrimethoxysilane, 3-mercaptopropyltrimethoxysilane, 3-aminopropyltris(methylethylketoxime)silane, 3-glycidoxy propyltriisopropenoxysilane, and 3-glycidoxypropylmethyldiisopropenoxysilane. The most preferred is use of an amine silane coupling agent. Such methylethylketoxime silane coupling agent may be incorporated at a content of 0.1 to 20 parts by weight, and preferably 0.2 to 10 parts by weight per 100 parts by weight of the component (a). When such silane coupling agent is used at a content of less than 0.1 parts by weight, sufficient adhesion is not realized while use in excess of 20 parts by weight may be economically disadvantageous.

If desired, the composition of the present invention may also contain a curing catalyst as the component (f) in order to promote curing of the composition. The curing catalyst may be the one which has been commonly used in the art as a curing accelerator for such composition, and exemplary such curing catalysts include metal Lewis acids, for example, organotin compounds such as dibutyltin dimethoxide, dibutyltin diacetate, dibutyltin dioctate, dibutyltin dilaurate, dibutyltin bis(acetylacetonate), dibutyltin bis(benzylmalate), dimethyltin dimethoxide, dimethyltin diacetate, dioctyltin dioctate, dioctyltin dilaurate, tin dioctate, and tin laulate; and organotitanium compounds such as tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diisopropoxy titanium bisethyl acetoacetate, di-tertiary butoxy titanium bisethyl acetoacetate, and di-tertiary butoxy titanium bismethyl acetoacetate; and amine compounds such as 3-aminopropyltrimethoxysilane and tetramethylguanidyl-propyltrimethoxysilane, and a salt thereof, which may be used alone or in combination of two or more. Such curing catalyst is preferably incorporated at a content of typically up to 10 parts by weight, and in particular, at 0.01 to 5 parts by weight per 100 parts by weight of the component (a). The content of the curing catalyst exceeding 10 parts by weight may invite cracks and damage of the article after the durability test, while excessively low content of the curing agent may result in an unduly retarded curing rendering use of the composition unpractical.

The composition of the present invention may also contain optional additives in addition to the components as described above. Exemplary such optional additives include a pigment, silica, a dye, a tackifier, a thixotropic agent, an antiseptic, a flame retardant, and an antimold, which may be added at a content commonly used in the art and which does not adversely affect the advantages of the present invention.

The composition of the present invention can be produced by mixing the components as described above in the absence of water or moisture by the method commonly used in the art, and in such a case, the components (b) and (c) may be preliminarily mixed before mixing with other components.

As described above, the room temperature-curable polyorganosiloxane composition of the present invention can be converted into a rubber elastomer exhibiting low to medium modulus by storing the composition in the condition free from water and exposing the composition to the moisture, for example, by opening the package to thereby promote reaction of the composition with the moisture in the air and curing of the composition at room temperature. In addition, the room temperature-curable polyorganosiloxane composition of the present invention is less likely to experience inhibition of the curing as seen in the case of the compositions which cure by the mechanism of hydrosilylation or the aminoxy type or the amide type compositions, and it has improved resistance to staining by bleeding when used with a porous material such as natural rock, and excellent adhesion to various substrates, and in particular, to the coated aluminum member. Accordingly, the composition is useful as an adhesive, a coating agent, and in particular, as a building sealant.

EXAMPLES

Next, the present invention is described in further detail by referring to Examples and Comparative Examples, which by no means limit the scope of the present invention. The room temperature-curable polyorganosiloxane compositions were evaluated for their physical properties according to the measurement procedure defined in JIS A 5758 "Sealants for sealing and glazing in buildings".

Example 1

100 parts by weight of a dimethylpolysiloxane end-capped at both ends with hydroxy group (having a viscosity at 23° C. of 100,000 mPa·s), 2.5 parts by weight of diphenyl methylsilanol, and 70 parts by weight of calcium carbonate (CARLEX 300 manufactured by Maruo Calcium Co., Ltd.) were homogeneously mixed, and 10 parts by weight of methyltris(methylethylketoxime)silane, 0.08 parts by weight of dioctyltin dilaurate, and 1.5 parts by weight of 3-aminopropyltriethoxysilane were added. The mixture was homogeneously mixed under reduced pressure by removing air bubbles to thereby prepare a composition.

Example 2

100 parts by weight of a dimethylpolysiloxane end-capped at both ends with hydroxy group (having a viscosity at 23° C. of 100,000 mPa·s), 2.5 parts by weight of diphenyl methylsilanol, and 70 parts by weight of calcium carbonate (CARLEX 300 manufactured by Maruo Calcium Co., Ltd.) were homogeneously mixed, and 10 parts by weight of methyltris(methylethylketoxime)silane, 0.02 parts by weight of dioctyltin dilaurate, and 2.5 parts by weight of 3-(N-aminomethylbenzylamino)propyltrimethoxysilane were added. The mixture was homogeneously mixed under reduced pressure by removing air bubbles to thereby prepare a composition.

Example 3

100 parts by weight of a dimethylpolysiloxane end-capped at both ends with hydroxy group (having a viscosity at 23° C. of 100,000 mPa·s), 2.5 parts by weight of diphenyl methylsilanol, 60 parts by weight of calcium carbonate (MC COAT S20 manufactured by Maruo Calcium Co., Ltd.), and 10 parts by weight of fumed silica (AEROSIL R972 manufactured by Nippon Aerosil Co., Ltd.) were homogeneously mixed, and 10 parts by weight of methyltris(methylethyl-ketoxime)silane, 0.02 parts by weight of dioctyltin dilaurate, and 2.5 parts by weight of 3-(N-aminomethylbenzyl-amino)propyl trimethoxysilane were added. The mixture was homogeneously mixed under reduced pressure by removing air bubbles to thereby prepare a composition.

Example 4

100 parts by weight of a dimethylpolysiloxane end-capped at both ends with hydroxy group (having a viscosity at 23° C. of 100,000 mPa·s) and 70 parts by weight of calcium carbonate (MC COAT S20 manufactured by Maruo Calcium Co., Ltd.) were homogeneously mixed, and to this mixture, 5 parts by weight of the component that had been prepared by mixing 4 parts by weight of methyltris(methylethylketoxime)-silane in relation to 1.0 part by weight of trimethylsilanol and allowing the mixture to stand under sealed condition at 23° C. for 1 hour, 6 parts by weight of methyltris(methylethyl-ketoxime)silane, 0.02 parts by weight of dioctyltin dilaurate, and 2.5 parts by weight of 3-(N-aminomethylbenzyl-amino)propyltrimethoxysilane were added. The mixture was homogeneously mixed under reduced pressure by removing air bubbles to thereby prepare a composition.

Example 5

100 parts by weight of a dimethylpolysiloxane end-capped at both ends with trimethoxysilylethyl group (having a viscosity at 23° C. of 100,000 mPa·s), 80 parts by weight of dimethylpolysiloxane, and 2.5 parts by weight of diphenyl methylsilanol were homogeneously mixed, and 8 parts by weight of phenyltrimethoxysilane and 6 parts by weight of diisopropyl di-tertiary butyl titanate were added. The mixture was homogeneously mixed under reduced pressure by removing air bubbles to thereby prepare a composition.

Comparative Example 1

100 parts by weight of a dimethylpolysiloxane end-capped at both ends with hydroxy group (having a viscosity at 23° C.

of 100,000 mPa·s), 70 parts by weight of a dimethylpolysiloxane end-capped at both ends with trimethylsiloxy group (having a viscosity at 23° C. of 100 mPa·s), and 100 parts by weight of calcium carbonate (CARLEX 300 manufactured by Maruo Calcium Co., Ltd.) were homogeneously mixed, and 10 parts by weight of methyltris(methylethylketoxime)silane, 0.08 parts by weight of dioctyltin dilaurate, and 1.5 parts by weight of 3-amino alumiethoxysilane were added. The mixture was homogeneously mixed under reduced pressure by removing air bubbles to thereby prepare a composition.

Comparative Example 2

100 parts by weight of a dimethylpolysiloxane end-capped at both ends with hydroxy group (having a viscosity at 23° C. of 100,000 mPa·s), 70 parts by weight of a dimethylpolysiloxane end-capped at both ends with trimethylsiloxy group (having a viscosity at 23° C. of 100 mPa·s), and 100 parts by weight of calcium carbonate (CARLEX 300 manufactured by Maruo Calcium Co., Ltd.) were homogeneously mixed, and 10 parts by weight of methyltris(methylethylketoxime)silane, 0.08 parts by weight of dioctyltin dilaurate, and 2.5 parts by weight of 3-(N-aminomethylbenzylamino)propyltrimethoxysilane were added. The mixture was homogeneously mixed under reduced pressure by removing air bubbles to thereby prepare a composition.

Comparative Example 3

100 parts by weight of a dimethylpolysiloxane end-capped at both ends with hydroxy group (having a viscosity at 23° C. of 100,000 mPa·s) and 100 parts by weight of calcium carbonate (CARLEX 300 manufactured by Maruo Calcium Co., Ltd.) were homogeneously mixed, and 10 parts by weight of methyltris(methylethylketoxime)silane, 0.02 parts by weight of dioctyltin dilaurate, and 1.5 parts by weight of 3-aminopropyltriethoxysilane were added. The mixture was homogeneously mixed under reduced pressure by removing air bubbles to thereby prepare a composition.

Comparative Example 4

100 parts by weight of a dimethylpolysiloxane end-capped at both ends with hydroxy group (having a viscosity at 23° C. of 100,000 mPa·s) and 100 parts by weight of calcium carbonate (CARLEX 300 manufactured by Maruo Calcium Co., Ltd.) were homogeneously mixed, and 10 parts by weight of methyltris(methylethylketoxime)silane, 0.02 parts by weight of dioctyltin dilaurate, and 2.5 parts by weight of 3-(N-aminomethylbenzylamino)propyltrimethoxysilane were added. The mixture was homogeneously mixed under reduced pressure by removing air bubbles to thereby prepare a composition.

H Type Adhesion Test

The room temperature-curable polyorganosiloxane composition produced in Example 1 to 5 and Comparative Example 1 to 4 were evaluated by Block H-1 adhesion test according to JIS A 5758 by the procedure as described below. The results are shown in Table 2.

Adhesion test was conducted by using an aluminum member coated with Kynar fluororesin (DIC Fluoro Metallic manufactured by Dainippon Ink and Chemicals Incorporated) for the test piece, and the room temperature-curable polyorganosiloxane composition as described above for the sealant. Initial adhesion test was carried out after curing at a temperature of 23° C. and a relative humidity of 50% for 14 days, and maturing at 30° C. for 14 days. After the initial maturing, the test block was further immersed in warm water at 50° C. for 7 days, and used for the adhesion test.

The block was evaluated by using Strograph R-2 manufactured by Toyo Seiki Seisaku-sho, Ltd. at a tensile speed of 50 mm/min.

The modulus at 50% elongation (M50) was evaluated according to the criteria of Japan Sealant Industry Association as shown in Table 1.

TABLE 1

| Division | M50 (N/mm$^2$) |
| --- | --- |
| Low modulus | less than 0.2 |
| Medium modulus | 0.2 to less than 0.4 |
| High modulus | 0.4 or higher |

Percentage of cohesive failure (CF) was evaluated by visually inspecting the fracture surface of the test piece and the sealant after the tensile, and calculating the percentage of the sealant remaining on the surface.

Evaluation of Staining Resistance on Granite

The room temperature-curable polyorganosiloxane composition produced in Examples 1 to 5 and Comparative Examples 1 to 4 was filled in the joint (having a width of 12 mm, a length of 100 mm, and a depth of 10 mm) between two granite pieces each having a width of 50 mm, a length of 100 mm, and a thickness of 10 mm, and allowed to cure at a temperature of 23° C. and relative humidity of 50% for 7 days. The cured test sample was aging at 70° C. for 7 days in a dryer. The test result was evaluated "fail" when staining such as oil bleed was visually confirmed on the granite near the joint, and "pass" when no such staining was found. The results are shown in Table 2.

TABLE 2

| Condition | Item | Unit | Example | | | | | Comparative Example | | | |
| | | | 1 | 2 | 3 | 4 | 5 | 1 | 2 | 3 | 4 |
| --- | --- | --- | --- | --- | --- | --- | --- | --- | --- | --- | --- |
| Initial | M50 | N/mm$^2$ | 0.38 | 0.33 | 0.24 | 0.31 | 0.38 | 0.28 | 0.29 | 0.58 | 0.67 |
| Initial | Modulus division | | Medium | Medium | Medium | Medium | Medium | Medium | High | High | High |
| Initial | CF % | % | 100 | 100 | 100 | 100 | 100 | 100 | 100 | 0 | 100 |
| After further immersion in water | CF % | % | 100 | 100 | 100 | 100 | 100 | 100 | 100 | 0 | 0 |
| After aging at 70° C. for 7 days | Staining of white granite | | Pass | Pass | Pass | Pass | Pass | Fail | Fail | Pass | Pass |

As evident from the results shown in Table 2, the room temperature-curable polyorganosiloxane composition of the present invention exhibits medium modulus property adequate for a building sealant, excellent adhesion to the surface treated aluminum member, and reduced staining by bleeding when used with white granite.

Japanese Patent Application No. 2006-143903 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A room temperature-curable polyorganosiloxane composition comprising
    (a) 100 parts by weight of a polydiorganosiloxane represented by the following general formula (1) or (2):

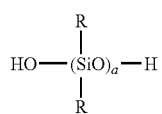

(1)

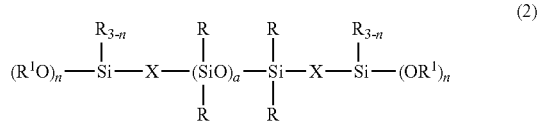

(2)

wherein R is independently an unsubstituted or substituted monovalent hydrocarbon group, a is an integer of at least 10, $R^1$ is independently an unsubstituted or substituted monovalent hydrocarbon group containing 1 to 6 carbon atoms, X is oxygen atom or an unsubstituted or substituted divalent hydrocarbon group containing 2 to 6 carbon atoms, and n is an integer of 1 to 3;
    (b) 0.5 to 10 parts by weight, per 100 parts by weight of component (a), of a triorganosilanol represented by general formula (3):

$$R^2{}_3SiOH \qquad (3)$$

wherein $R^2$ is independently an unsubstituted or substituted monovalent hydrocarbon group containing 1 to 20 carbon atoms;
    (c) 1 to 20 parts by weight of an organosilane containing at least 3 hydrolyzable groups in one molecule and/or its partial hydrolysate; and
    (d) 10 to 300 parts by weight of calcium carbonate.

2. A room temperature-curable polyorganosiloxane composition according to claim 1 wherein a straight chain and/or a branched polydiorganosiloxane containing at least 2 triorganosiloxy groups in one molecule is present in an amount of from 0 parts by weight to less than 10 parts by weight in relation to 100 parts by weight of the component (a).

3. A room temperature-curable polyorganosiloxane composition according to claim 1 which further comprises (e) a silane coupling agent.

4. A room temperature-curable polyorganosiloxane composition according to claim 1, which further comprises (f) a curing catalyst.

5. A room temperature-curable polyorganosiloxane composition according to claim 1 which is a sealant used in buildings.

6. A room temperature-curable polyorganosiloxane composition according to claim 1, wherein $R^2$ of formula (3) is independently selected from the group consisting of methyl group, ethyl group, phenyl group, vinyl group and trifluoropropyl group.

7. A room temperature-curable polyorganosiloxane composition according to claim 1, wherein $R^2$ of formula (3) is independently selected from the group consisting of methyl group and phenyl group.

8. A room temperature-curable polyorganosiloxane composition according to claim 1, wherein component (b) is diphenyl methylsilanol or trimethylsilanol.

9. A room temperature-curable polyorganosiloxane composition according to claim 1 wherein the triorganosilanol of formula (3) is contained in an amount of 1.0 to 10 parts by weight per 100 parts by weight of component (a).

10. A room temperature-curable polyorganosilaxane composition according to claim 1 wherein calcium carbonate of component (d) has been treated with a fatty acid, a resin acid, a rosin acid, and/or an alkali metal salt, an alkaline earth metal salt, a fatty acid ester, or a quaternary ammonium salt thereof.

* * * * *